(12) United States Patent
Huang et al.

(10) Patent No.: US 10,998,723 B1
(45) Date of Patent: May 4, 2021

(54) LARGE-SCALE PHOTOVOLTAIC DC SERIES BOOST GRID-CONNECTED SYSTEM WITH POWER BALANCER

(71) Applicant: INSTITUTE OF ELECTRICAL ENGINEERING, CHINESE ACADEMY OF SCIENCES, Beijing (CN)

(72) Inventors: Xinke Huang, Beijing (CN); Huan Wang, Beijing (CN); Junlong Lu, Beijing (CN); Yibo Wang, Beijing (CN); Jianhong Guo, Beijing (CN); Hongyang You, Beijing (CN); Xinlei Zhang, Beijing (CN)

(73) Assignee: INSTITUTE OF ELECTRICAL ENGINEERING, CHINESE ACADEMY OF SCIENCES, Beijing (CN)

( * ) Notice: Subject to any disclaimer, the term of this patent is extended or adjusted under 35 U.S.C. 154(b) by 45 days.

(21) Appl. No.: 16/666,443

(22) Filed: Oct. 29, 2019

Related U.S. Application Data

(63) Continuation of application No. PCT/CN2019/113545, filed on Oct. 28, 2019.

(30) Foreign Application Priority Data

Oct. 25, 2019 (CN) .......................... 201911025575.8

(51) Int. Cl.
*H02J 1/14* (2006.01)
*H02S 40/30* (2014.01)

(52) U.S. Cl.
CPC ................ *H02J 1/14* (2013.01); *H02S 40/30* (2014.12)

(58) Field of Classification Search
CPC .... H02J 3/38; H02J 3/383; H02J 3/381; H02J 3/385; H02J 1/10; G05F 1/67;
(Continued)

(56) References Cited

U.S. PATENT DOCUMENTS

| 2009/0284998 A1* | 11/2009 | Zhang | ...................... G05F 1/67 363/55 |
| 2014/0145509 A1* | 5/2014 | Willis | ...................... G05F 1/67 307/77 |

(Continued)

FOREIGN PATENT DOCUMENTS

| CN | 103166239 A | * | 6/2013 | .............. H02J 3/381 |
| CN | 104615188 A | * | 5/2015 | |
| CN | 105305407 A | * | 2/2016 | |

*Primary Examiner* — Nguyen Tran
*Assistant Examiner* — Jagdeep S Dhillon
(74) *Attorney, Agent, or Firm* — Bayramoglu Law Offices LLC

(57) ABSTRACT

A large-scale photovoltaic direct current (DC) series boost grid-connected system with a power balancer, including N photovoltaic DC converters and N−1 power balancers, wherein N≥2. The output ends of the photovoltaic DC converters are connected successively in series and then connected to the DC grid, and the input ends of the photovoltaic DC converters are respectively connected to the output ends of the photovoltaic power generation unit. Among the photovoltaic DC converters, which are arranged successively in series, a power balancer is disposed between the input ends of two photovoltaic DC converters adjacent to each other. The N−1 power balancers are arranged correspondingly to the set N−1 photovoltaic DC converters respectively to balance the input power of the corresponding photovoltaic DC converter, thereby eliminating a difference between the output voltages of the photovoltaic DC converters.

15 Claims, 2 Drawing Sheets

(58) Field of Classification Search
CPC ..... Y02E 10/56; H02S 40/20; H01L 31/0232; H01L 31/054; H05K 1/0257
USPC .......................... 307/117, 80, 82, 87, 66, 64
See application file for complete search history.

(56) References Cited

U.S. PATENT DOCUMENTS

| | | | |
|---|---|---|---|
| 2015/0162750 A1* | 6/2015 | Varma | H02J 3/50 |
| | | | 307/52 |
| 2017/0222601 A1* | 8/2017 | Xu | H02S 50/10 |
| 2017/0250540 A1* | 8/2017 | Varma | H02J 3/50 |
| 2018/0006463 A1* | 1/2018 | Bintz, II | H02J 3/381 |
| 2018/0276971 A1* | 9/2018 | Nagata | H04W 92/10 |
| 2019/0074768 A1* | 3/2019 | Yu | H02M 1/36 |
| 2019/0305560 A1* | 10/2019 | Wang | H02J 3/381 |
| 2020/0119561 A1* | 4/2020 | McMorrow | H02J 3/38 |
| 2020/0303925 A1* | 9/2020 | Reddy | H02J 3/382 |

* cited by examiner

LARGE-SCALE PHOTOVOLTAIC DC SERIES BOOST GRID-CONNECTED SYSTEM WITH POWER BALANCER

CROSS REFERENCE TO THE RELATED APPLICATIONS

This application is the continuation application of International Application No. PCT/CN2019/113545, filed on Oct. 28, 2019, which is based upon and claims priority to Chinese Patent Application No. 201911025575.8, filed on Oct. 25, 2019, the entire contents of which are incorporated herein by reference.

TECHNICAL FIELD

The present disclosure belongs to the technical field of photovoltaic power generation. More particularly, the present disclosure relates to a large-scale photovoltaic direct current (DC) series boost grid-connected system with a power balancer.

BACKGROUND

The development and utilization of new energy such as solar photovoltaic and wind power are an important way to solve the energy crisis and environmental issues. At present, many million kilowatt-scale photovoltaic bases have emerged. Traditional large-scale photovoltaic power stations are usually integrated into the alternating current (AC) transmission network by means of centralized AC collection, boost, and medium/high-voltage AC. Since photovoltaic power stations are becoming larger, the traditional AC grid-connected mode presents problems such as harmonic resonance, inability to absorb and send power, and requires large-capacity reactive power compensation. Also, the conversion equipment and conversion links required for AC grid-connection are numerous and have low-efficiency.

With the rapid development of flexible medium/high voltage DC transmission, currently, the photovoltaic DC boost collection access scheme is used, which can effectively avoid the problem of sending out power in an AC grid connection of traditional photovoltaic power station. Moreover, the photovoltaic DC grid connection can reduce power conversion links, save power conversion equipment, lower system cost, and improve overall system efficiency, which has obvious economic and technological advantages. In particular, the photovoltaic DC series boost grid-connected system has become an active area of research. The technical difficulty of the photovoltaic DC series boost grid-connected system lies in that, when there is a mismatch of input power of the photovoltaic DC converters in the series system, the problems of outputting overvoltage and curtailment will occur in the photovoltaic DC converters.

SUMMARY

In order to solve the above problems in the prior art, that is, to solve the problems of outputting overvoltage and curtailment of a photovoltaic DC converter series boost grid-connected system in a large-scale photovoltaic power station caused by the mismatch of input power of the photovoltaic DC converters in the system, according to one aspect of the present disclosure, a large-scale photovoltaic DC series boost grid-connected system with a power balancer is provided. The system includes N photovoltaic DC converters and N−1 power balancers, wherein N≥2.

The output ends of various photovoltaic DC converters are connected in series and then connected to the DC grid. The input ends of the various photovoltaic DC converters are respectively connected to the output ends of a photovoltaic power generation unit.

Among the photovoltaic DC converters arranged successively in series, a power balancer is disposed between the input ends of two photovoltaic DC converters adjacent to each other.

The N−1 power balancers are arranged corresponding to the set N−1 photovoltaic DC converters respectively to balance the input power of the corresponding photovoltaic DC converter, thereby eliminating a difference between the output voltages of the various photovoltaic DC converters.

In some preferred embodiments, the power balancer includes a control signal input end, a main power circuit, and a current path connection end.

The control signal input end is configured to obtain an output voltage value $V_i$ of the corresponding photovoltaic DC converter and an average value $V_a$ of the output voltage values of the N photovoltaic DC converters.

The main power circuit is configured to control the current between the input ends of two photovoltaic DC converters based on a difference between the values of $V_i$ and $V_a$.

Two ends of the current path connection end are respectively connected to the input ends of the corresponding two photovoltaic DC converters for establishing a current path.

In some preferred embodiments, a method of controlling the current between the input ends of the two photovoltaic DC converters based on the difference between the values of $V_i$ and $V_a$ is as follows.

When $V_i > V_a$, the power balancer corresponding to the $i^{th}$ photovoltaic DC converter generates a negative current based on the difference between the values of $V_i$ and $V_a$, and shunts the output current of the photovoltaic power generation unit corresponding to the $i^{th}$ photovoltaic DC converter, so as to reduce the input current of the $i^{th}$ photovoltaic DC converter.

When $V_i < V_a$, the power balancer corresponding to the $i^{th}$ photovoltaic DC converter generates a positive current based on the difference between the values of $V_i$ and $V_a$, and merges with the output current of the photovoltaic power generation unit corresponding to the $i^{th}$ photovoltaic DC converter, so as to increase the input current of the $i^{th}$ photovoltaic DC converter.

In some preferred embodiments, the power balancer is provided with a bypass circuit, and the output end of the photovoltaic DC converter is provided with a shorting circuit. When any one of the photovoltaic DC converters fails, the corresponding photovoltaic power generation unit can be connected through the bypass circuit to the photovoltaic DC converter which is adjacent to the failed photovoltaic DC converter connected by the power balancer corresponding to the failed photovoltaic DC converter. Meanwhile, the output end of the failed photovoltaic DC converter is shorted through the shorting circuit, so as to maintain the access of the output ends of the various photovoltaic DC converters to the DC grid after being connected in series.

In some preferred embodiments, the photovoltaic DC converter adopts a double closed-loop control strategy of the input voltage and the input current for maximum power point tracking control.

In some preferred embodiments, the power balancer is controlled by a closed-loop control of the output voltage of the photovoltaic DC converter.

According to a second aspect of the present disclosure, a power balancing method for a large-scale photovoltaic DC series boost grid-connected system is provided. Based on the aforementioned large-scale photovoltaic DC series boost grid-connected system with the power balancer, each power balancer separately balances the input power of the corresponding photovoltaic DC converter.

The method includes after the large-scale photovoltaic DC series boost grid-connected system is started normally, obtaining an output voltage value $V_i$ of the $i^{th}$ photovoltaic DC converter and an average value $V_a$ of output voltage values of the N photovoltaic DC converters and carrying out the following balance control.

When $V_i=V_a$, the power balancer corresponding to the $i^{th}$ photovoltaic DC converter does not work.

When $V_i>V_a$, the power balancer corresponding to the $i^{th}$ photovoltaic DC converter generates a negative current based on a difference between the values of $V_i$ and $V_a$, and shunts an output current of the photovoltaic power generation unit corresponding to the $i^{th}$ photovoltaic DC converter, so as to reduce the input current of the $i^{th}$ photovoltaic DC converter.

When $V_i<V_a$, the power balancer corresponding to the $i^{th}$ photovoltaic DC converter generates a positive current based on the difference between the values of $V_i$ and $V_a$, and merges with the output current of the photovoltaic power generation unit corresponding to the $i^{th}$ photovoltaic DC converter, so as to increase the input current of the $i^{th}$ photovoltaic DC converter.

In some preferred implementations, a photovoltaic DC converter without a power balancer always works in a maximum power point tracking mode by adopting a closed-loop control of maximum power point tracking and controls the amplitude of the output voltage of the photovoltaic DC converter.

According to a third aspect of the present disclosure, a photovoltaic DC power generation system is provided, including N groups of photovoltaic power generation units and the aforementioned large-scale photovoltaic DC series boost grid-connected system with the power balancer.

The advantages of the present disclosure are as follows.

The present disclosure can solve the problems of curtailment and overvoltage in a photovoltaic DC series boost grid-connected system caused by the mismatch of input power of the photovoltaic DC converters. The present disclosure also solves the problem that the system power generation decreases due to the mismatch of input power of the photovoltaic DC converters, thereby increasing the system generating capacity.

BRIEF DESCRIPTION OF THE DRAWINGS

Other features, objectives and advantages of the present disclosure will become more apparent from the detailed description of the non-restrictive embodiment(s) with reference to the following drawings.

DETAILED DESCRIPTION OF THE EMBODIMENTS

Figure 1:
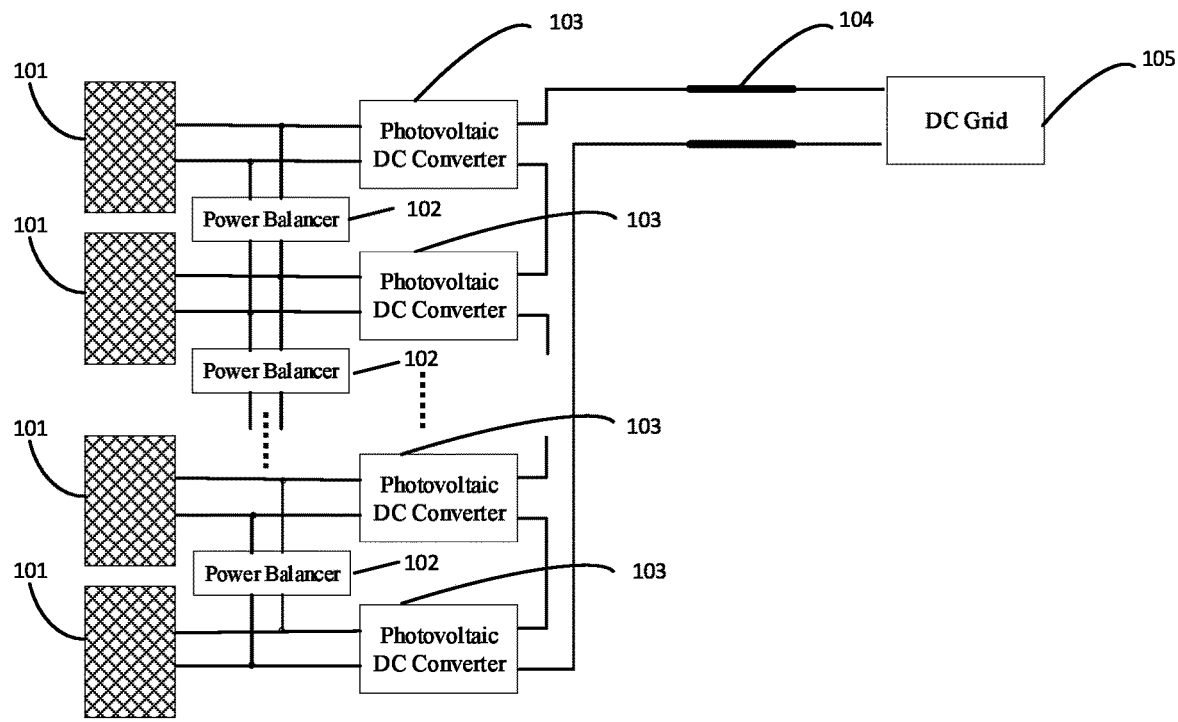
FIG. 1 is a schematic diagram of the large photovoltaic DC series boost grid-connected system with the power balancer according to an embodiment of the present disclosure.

In order to make the objectives, technical solutions and advantages of the present disclosure more clear, the technical solutions in the embodiments of the present disclosure will be clearly and completely described below in conjunction with the accompanying drawings. Obviously, the described embodiments are some and/or part of the embodiments of the present disclosure, rather than all embodiments. Based on the embodiments in the present disclosure, all other embodiments obtained by those skilled in the art without making creative efforts shall fall within the protection scope of the present disclosure.

The present disclosure will be further described below in conjunction with the embodiments and the drawings. It is understood that the specific embodiments described herein are merely illustrative of the present disclosure and are not intended to limit the present disclosure. It should also be noted that, for the convenience of description, only the parts related to the related invention are shown in the drawings.

It should be noted that, on the premise of no conflict, the embodiments in the present disclosure and the features in the embodiments may be combined with each other.

According to the present disclosure, a large-scale photovoltaic DC series boost grid-connected system with a power balancer includes N photovoltaic DC converters and N−1 power balancers, wherein N≥2. The output ends of the photovoltaic DC converters are connected successively in series and then connected to the DC grid. The input ends of the photovoltaic DC converters are independent from each other and are respectively connected to the output ends of the corresponding photovoltaic power generation unit. Among the photovoltaic DC converters being arranged successively in series, a power balancer is disposed between the input ends of two adjacent photovoltaic DC converters. The N−1 power balancers are arranged corresponding to the set N−1 photovoltaic DC converters respectively to balance the input power of the corresponding photovoltaic DC converter, thereby eliminating a difference between the output voltages of the photovoltaic DC converters.

According to the present disclosure, the photovoltaic power generation unit may be a photovoltaic component, a photovoltaic string or a photovoltaic array. In this embodiment, the photovoltaic power generation unit is a photovoltaic array. As shown in FIG. 1, N sets of the photovoltaic arrays 101 are respectively arranged in a one-to-one correspondence with the N photovoltaic DC converters 103. The N photovoltaic DC converters 103 are successively connected in series, and then connected to the DC grid 105 through the high voltage DC line 104. The power balancer 102 is arranged between two photovoltaic DC converters 103 adjacent to each other, and the power balancer 102 is respectively connected to the input ends of the two photovoltaic DC converters 103 adjacent to each other.

Figure 2:
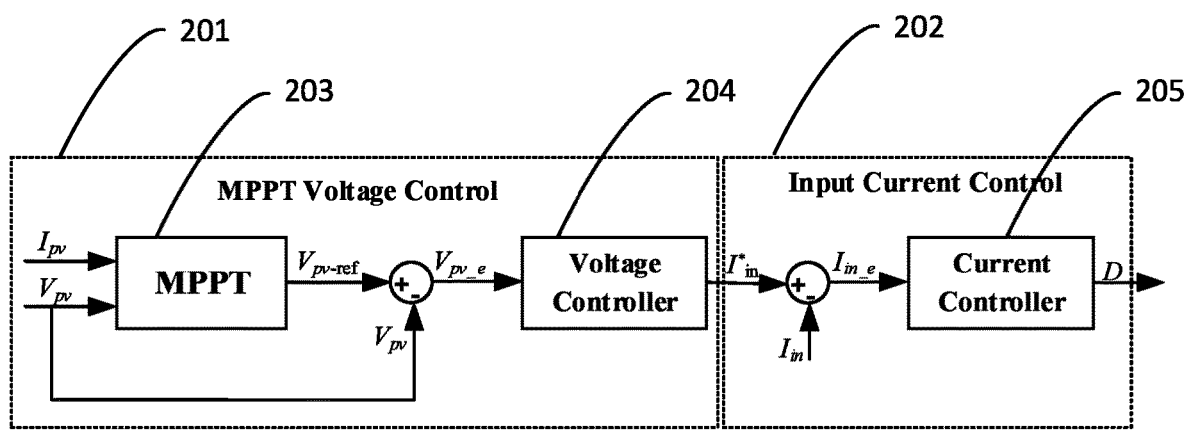
FIG. 2 is a control block diagram of the photovoltaic DC converter according to an embodiment of the present disclosure.

As shown in FIG. 2, in the large-scale photovoltaic DC series boost grid-connected system with the power balancer, each photovoltaic DC converter detects the output voltage $V_{PV}$ and the output current $I_{PV}$ of the corresponding photovoltaic array in real time. Then the maximum power point tracking algorithm is realized through the maximum power point tracking (MPPT) controller. Given the reference voltage $V_{PV\text{-}ref}$ of the MPPT, comparing the actual output voltage $V_{PV}$ of the photovoltaic array with the reference voltage $V_{PV\text{-}ref}$ of the MPPT, a voltage difference $V_{PV\text{-}e}$ is obtained. An input current reference value $I_{in}^*$ of the photovoltaic DC converter is obtained after passing through the voltage controller. When comparing the actual input current $I_{in}$ of the photovoltaic DC converter with the input current reference value $I_{in}^*$, a current difference $L_{in\text{-}e}$ is obtained. A control duty cycle D of the photovoltaic DC converter is obtained after passing through the current controller. Finally, the double closed-loop control of the maximum power point tracking of the photovoltaic DC converter is realized. FIG. 2 shows the photovoltaic DC converter, the MPPT voltage control loop 201, the photovoltaic DC converter input current control loop 202, the MPPT control algorithm module 203, the MPPT voltage controller 204, and the photovoltaic DC converter input current controller 205.

Figure 3:
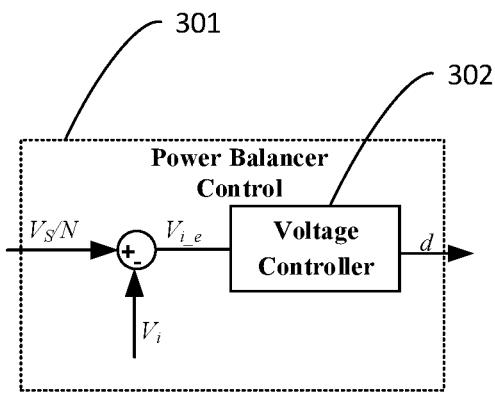
FIG. 3 is a control block diagram of the power balancer according to an embodiment of the present disclosure.

The power balancer includes a control signal input end, a main power circuit, and a current path connection end. The control signal input end is configured to obtain an output voltage value $V_i$ of the corresponding photovoltaic DC converter and an average value $V_a$ of the output voltage values of the N photovoltaic DC converters. The main power circuit is configured to control a current between the input ends of two photovoltaic DC converters based on a difference between the values of $V_i$ and $V_a$. The two ends of the current path connection end are respectively connected to the input ends of the corresponding two photovoltaic DC converters for establishing a current path. As shown in FIG. 3, in the $i^{th}$ power balancer, comparing the real-time output voltage value $V_i$ of the $i^{th}$ photovoltaic DC converter corresponding to the $i^{th}$ power balancer with the average value $V_a$ of the output voltage values of all the photovoltaic DC converters ($V_a=V_s/N$, where $V_s$ is the sum of the output voltage values of all the photovoltaic DC converters), a voltage difference is obtained, and a control duty cycle d of the $i^{th}$ power balancer is obtained after passing through the voltage controller, thereby further controlling the direction and magnitude of the current in the $i^{th}$ power balancer. FIG. 3 shows the photovoltaic DC converter output voltage control loop 301 and the photovoltaic DC converter output voltage controller 302.

When the input power of the photovoltaic DC converters, which are connected in series, is balanced each photovoltaic DC converter can achieve maximum power point tracking normally and run in the maximum power point tracking mode, and almost no current flows in the power balancer. When the input power of the photovoltaic DC converters, which are connected in series, is unbalanced each photovoltaic DC converter can still achieve the maximum power point tracking normally and run in the maximum power point tracking mode. At this time, by determining the relationship between the actual output voltage and the average output voltage of the photovoltaic DC converters, the power balancer is controlled to operate, a current flows through the power balancer, and the direction of the current is determined by the relationship between the actual output voltage and the average output voltage of the photovoltaic DC converters. Thereby, the input power balance of the photovoltaic DC converters, which are connected in series, can be achieved and the output voltage of the photovoltaic DC converters can be maintained at the average output voltage.

In the power balancer, the method of controlling the current between the input ends of two photovoltaic DC converters based on the difference between the values of $V_i$ and $V_a$ is as follows.

When $V_i > V_a$, the power balancer corresponding to the $i^{th}$ photovoltaic DC converter generates a negative current based on the difference between the values of $V_i$ and $V_a$, and shunts the output current of the photovoltaic power generation unit corresponding to the $i^{th}$ photovoltaic DC converter, so as to reduce the input current of the $i^{th}$ photovoltaic DC converter.

When $V_i < V_a$, the power balancer corresponding to the $i^{th}$ photovoltaic DC converter generates a positive current based on the difference between the values of $V_i$ and $V_a$, and merges with the output current of the photovoltaic power generation unit corresponding to the $i^{th}$ photovoltaic DC converter, so as to increase the input current of the $i^{th}$ photovoltaic DC converter.

In the present embodiment, the power balancer is provided with a bypass circuit, and the output end of the photovoltaic DC converter is provided with a shorting circuit. When any one of the photovoltaic DC converters fails, the corresponding photovoltaic power generation unit can be connected through the bypass circuit to the photovoltaic DC converter which is adjacent to the failed photovoltaic DC converter connected by the power balancer corresponding to the failed photovoltaic DC converter. Meanwhile, the output end of the failed photovoltaic DC converter is shorted through the shorting circuit, so as to maintain the access of the output ends of the photovoltaic DC converters to the DC grid after being connected in series. By this way, the photovoltaic array can continue to output power.

In this embodiment, the photovoltaic DC converter adopts the double closed-loop control strategy of the input voltage and the input current for maximum power point tracking control, and the power balancer adopts the closed-loop control of the output voltage of the photovoltaic DC converter.

In this embodiment, all of the photovoltaic DC converters shall limit the output voltage amplitude and all of the power balancers shall limit the current amplitude to ensure the safety of the photovoltaic DC converters and the power balancers.

According to the present disclosure, the control of the large-scale photovoltaic DC series boost grid-connected system with the power balancer can be divided into two parts. The first part is the control of each photovoltaic DC converter connected in series, where the controllers of all of the photovoltaic DC converters can be regarded as independent from each other and mainly realize the maximum power point tracking control of their corresponding photovoltaic array by adopting the double closed-loop control strategy of the input voltage and the input current. The second part is the control of N–1 power balancers in the series system. Each power balancer is mainly controlled by the relationship between the real-time output voltage and the average output voltage of the corresponding photovoltaic DC converter by the closed-loop control of the output voltage of the photovoltaic DC converter. Thereby, adaptive coordinated control of the N photovoltaic DC converters and the N–1 power balancers in the series system can be achieved.

Figure 4:
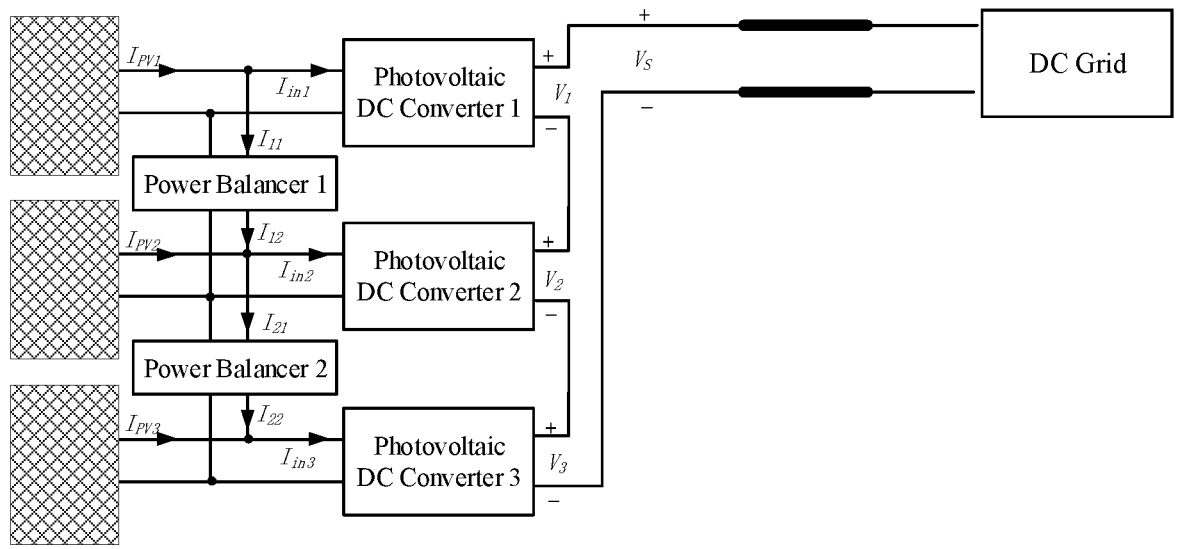
FIG. 4 is a schematic diagram of the large photovoltaic DC series boost grid-connected system with the power balancer when N=3 according to an embodiment of the present disclosure.

FIG. 4 shows an embodiment of the large-scale photovoltaic DC series boost grid-connected system with the power balancer when N=3, wherein, the system includes three photovoltaic arrays, three photovoltaic DC converters and two power balancers. The power balancer 1 is set between the input end of the photovoltaic DC converter 1 and the input end of the photovoltaic DC converter 2. The power balancer 2 is set between the input end of the photovoltaic DC converter 2 and the input end of the photovoltaic DC converter 3. The output ends of the three photovoltaic DC converters are connected successively in series and then connected to the DC grid. In the system shown in FIG. 4, the output voltage of the photovoltaic DC converter 3 is lower than the average value of the output voltages of all of the photovoltaic DC converters. The power balancer 1 shunts the current of the input end of the photovoltaic DC converter 1 to obtain the current $I_{11}$. The output current $I_{PV1}$ of the first photovoltaic array is changed to be $I_{in1}$ as the input of the photovoltaic DC converter 1. The current $I_{11}$ is changed to be the current $I_{12}$ after passing through the power balancer 1, and the current $I_{12}$ merges with the output current $I_{PV2}$ of the photovoltaic array corresponding to the photovoltaic DC converter 2. The power balancer 2 shunts the current of the input end of the photovoltaic DC converter 2 to obtain the current $I_{21}$. The current merged by the output current $I_{PV1}$ of the first photovoltaic array with $I_{12}$ is changed to be $I_{in2}$ as the input of the photovoltaic DC converter 2. The current $I_{21}$ is changed to be the current $I_{22}$ after passing through the power balancer 2, and the current $I_{22}$ merges with the output current $I_{PV3}$ of the photovoltaic array corresponding to the photovoltaic DC converter 3 to obtain the input current $I_{in3}$ of the photovoltaic DC converter 3. The output voltages of the three photovoltaic DC converters are $V_1$, $V_2$, $V_3$, respectively, and their combined voltage is $V_s$.

According to the present disclosure, this embodiment relates to the power balancing method for the large-scale photovoltaic DC series boost grid-connected system. Based on the aforementioned large-scale photovoltaic DC series boost grid-connected system with the power balancer, after the system is started when the startup conditions are met, each photovoltaic DC converter gradually enters the maximum power point tracking mode, and each power balancer separately balances the input power of the corresponding photovoltaic DC converter.

Taking the $i^{th}$ photovoltaic DC converter and the $i^{th}$ power balancer corresponding to the $i^{th}$ photovoltaic DC converter as an example, the output voltage value $V_i$ of the $i^{th}$ photovoltaic DC converter and the average value $V_a$ of the output voltage values of the N photovoltaic DC converters are obtained, and the following balance control is carried out.

When $V_i = V_a$, the $i^{th}$ photovoltaic DC converter runs in the maximum power point tracking mode, and the power balancer corresponding to the $i^{th}$ photovoltaic DC converter does not work. That is, no current flows in the $i^{th}$ power balancer.

When $V_i > V_a$, the $i^{th}$ photovoltaic DC converter runs in the maximum power point tracking mode, while the output voltage of at least one photovoltaic DC converter in the series system is smaller than the average output voltage of the converters. That is, the input power of the photovoltaic DC converters in the series system is unbalanced. At this time, the $i^{th}$ power balancer starts to work, generates a negative current based on the difference between the value of $V_i$ and $V_a$, and shunts the output current of the photovoltaic power generation unit corresponding to the $i^{th}$ photovoltaic DC converter, so as to reduce the input current of the $i^{th}$ photovoltaic DC converter and thereby reducing the input power and the output voltage of the $i^{th}$ photovoltaic DC converter, compensating the photovoltaic DC converter whose input power and output voltage are lower than the average input power and the average output voltage of the converters, and finally realizing the balance of the input power and the output voltage of all of the photovoltaic DC converters in the series system.

When $V_i < V_a$, the $i^{th}$ photovoltaic DC converter runs in the maximum power point tracking mode, while the output voltage of at least one photovoltaic DC converter in the series system is greater than the average output voltage of the converters. That is, the input power of the photovoltaic DC converters in the series system is unbalanced. At this time, the $i^{th}$ power balancer starts to work, generates a positive current based on the difference between the values of and $V_a$, and merges with the output current of the photovoltaic power generation unit corresponding to the $i^{th}$ photovoltaic DC converter to increase the input current of the $i^{th}$ photovoltaic DC converter and thereby increasing the input power and the output voltage of the $i^{th}$ photovoltaic DC converter, eliminating the photovoltaic DC converter whose input DC power and output voltage are greater than the average input power and the average output voltage of the converters, and finally realizing the balance of the input power and the output voltage of all of the photovoltaic DC converters in the series system.

A photovoltaic DC converter with no power balancer always works in the maximum power point tracking mode by adopting the closed-loop control of the maximum power point tracking and controls the amplitude of the output voltage of the photovoltaic DC converter to insure the safety of the photovoltaic DC converter.

According to one embodiment of the present disclosure, a photovoltaic DC power generation system includes N groups of photovoltaic power generation units and the aforementioned large-scale photovoltaic DC series boost grid-connected system with the power balancer.

It will be clearly understood by those skilled in the art that, for the convenience and brevity of the description, the specific working process and related description of the above-mentioned photovoltaic DC power generation system can refer to the corresponding process in the embodiment(s) of the large-scale photovoltaic DC series boost grid-connected system with the power balancer, which will not be further described here.

The term "include" or any other similar language aims to cover a non-exclusive contain. That is, a process, method, article or equipment/device that includes a series of elements includes not only those elements, but also other elements that are not explicitly listed, or the elements inherent in such process, method, article or equipment/device.

Heretofore, the technical solutions of the present disclosure have been described in conjunction with the preferred embodiments shown in the drawings, but it is obvious to those skilled in the art that the protection scope of the present disclosure is not limited to the specific embodiments. Those skilled in the art can make equivalent modifications or alternatives to the related technical features without departing from the principles of the present disclosure, and these modifications and alternatives shall fall within the protection scope of the present disclosure.

What is claimed is:

1. A large-scale photovoltaic DC series boost grid-connected system with a power balancer, comprising: N photovoltaic DC converters and N−1 power balancers, wherein N≥2; wherein, output ends of the N photovoltaic DC converters are connected in series and then connected to a DC grid, and input ends of the photovoltaic DC converters are respectively connected with output ends of photovoltaic power generation units;

one power balancer is disposed between input ends of every two adjacent photovoltaic DC converters;

the N−1 power balancers are arranged corresponding to N−1 photovoltaic DC converters respectively to balance input power of the corresponding N−1 photovoltaic DC converters, thereby eliminating a difference between output voltages of the N−1 photovoltaic DC converters;

wherein, each power balancer comprises a control signal input end, a main power circuit, and a current path connection end;

the control signal input end is configured to obtain an output voltage value $V_i$ of a corresponding photovoltaic DC converter and an average value $V_a$ of output voltage values of the N photovoltaic DC converters;

the main power circuit is configured to control a current between the input ends of the two adjacent photovoltaic DC converters based on a difference between the values of $V_i$ and $V_a$;

two ends of the current path connection end are respectively connected to the input ends of the two adjacent photovoltaic DC converters for establishing a current path;

wherein a method of controlling the current between the input ends of the two adjacent photovoltaic DC converters based on the difference between the values of $V_i$ and $V_a$ is as follows:

wherein when $V_i > V_a$, the power balancer corresponding to the $i^{th}$ photovoltaic DC converter is configured to generate a negative current based on the difference between the values of $V_i$ and $V_a$, and shunt an output current of the photovoltaic power generation unit corresponding to the $i^{th}$ photovoltaic DC converter to reduce the input current of the $i^{th}$ photovoltaic DC converter;

wherein when $V_i < V_a$, the power balancer corresponding to the $i^{th}$ photovoltaic DC converter is configured to generate a positive current based on the difference between the values of $V_i$ and $V_a$, and merge with the output current of the photovoltaic power generation unit corresponding to the $i^{th}$ photovoltaic DC converter to increase the input current of the $i^{th}$ photovoltaic DC converter.

2. The large-scale photovoltaic DC series boost grid-connected system with the power balancer according to claim 1, wherein, each power balancer is provided with a bypass circuit, and an output end of each photovoltaic DC converter is provided with a shorting circuit; wherein when any one of the N photovoltaic DC converters fails, a corresponding photovoltaic power generation unit is configured to be connected via the bypass circuit to a photovoltaic DC converter adjacent to the failed photovoltaic DC converter through the power balancer corresponding to the failed photovoltaic DC converter, and an output end of the failed photovoltaic DC converter is shorted through the shorting circuit, so as to maintain an access of the output end of the photovoltaic DC converters to the DC grid after being connected in series.

3. The large-scale photovoltaic DC series boost grid-connected system with the power balancer according to claim 1, wherein, each photovoltaic DC converter adopts a double closed-loop control strategy of an input voltage and an input current for a maximum power point tracking control.

4. The large-scale photovoltaic DC series boost grid-connected system with the power balancer according to claim 1, wherein, each power balancer is controlled by a closed-loop control of the output voltage of the N photovoltaic DC converters.

5. A power balancing method for a large-scale photovoltaic DC series boost grid-connected system, wherein the large-scale photovoltaic DC series boost grid-connected system with a power balancer comprises:

N photovoltaic DC converters and N−1 power balancers, wherein N≥2; wherein, output ends of the N photovoltaic DC converters are connected in series and then connected to a DC grid, and input ends of the photovoltaic DC converters are respectively connected with output ends of photovoltaic power generation units;

one power balancer is disposed between input ends of every two adjacent photovoltaic DC converters;

the N−1 power balancers are arranged corresponding to N−1 photovoltaic DC converters respectively to balance input power of the corresponding N−1 photovoltaic DC converters, thereby eliminating a difference between output voltages of the N−1 photovoltaic DC converters;

wherein, based on the large-scale photovoltaic DC series boost grid-connected system with the power balancer, each power balancer separately balances the input power of the corresponding photovoltaic DC converter, the power balancing method comprising:

after the large-scale photovoltaic DC series boost grid-connected system is started, obtaining an output voltage value $V_i$ of the $i^{th}$ photovoltaic DC converter and an average value $V_a$ of output voltage values of N photovoltaic DC converters, and carrying out the following balance control:

wherein when $V_i = V_a$, the power balancer corresponding to the $i^{th}$ photovoltaic DC converter does not work;

wherein when $V_i > V_a$, the power balancer corresponding to the $i^{th}$ photovoltaic DC converter generates a negative current based on a difference between the values of $V_i$ and $V_a$, and shunts an output current of the photovoltaic power generation unit corresponding to the $i^{th}$ photovoltaic DC converter to reduce the input current of the $i^{th}$ photovoltaic DC converter;

wherein when $V_i < V_a$, the power balancer corresponding to the $i^{th}$ photovoltaic DC converter generates a positive current based on the difference between the values of $V_i$ and $V_a$, and merges with the output current of the photovoltaic power generation unit corresponding to the $i^{th}$ photovoltaic DC converter to increase the input current of the $i^{th}$ photovoltaic DC converter.

6. The power balancing method for the large-scale photovoltaic DC series boost grid-connected system according to claim 5, wherein, a photovoltaic DC converter without a power balancer always works in a maximum power point tracking mode by adopting a closed-loop control of a maximum power point tracking, and controls an amplitude of the output voltage of the photovoltaic DC converter.

7. A photovoltaic DC power generation system, comprising: N groups of photovoltaic power generation units, and the large-scale photovoltaic DC series boost grid-connected system with the power balancer of claim 1.

8. The large-scale photovoltaic DC series boost grid-connected system with the power balancer according to claim 1, wherein, each photovoltaic DC converter adopts the double closed-loop control strategy of an input voltage and an input current for a maximum power point tracking control.

9. The large-scale photovoltaic DC series boost grid-connected system with the power balancer according to claim 2, wherein, each photovoltaic DC converter adopts the double closed-loop control strategy of an input voltage and an input current for a maximum power point tracking control.

10. The large-scale photovoltaic DC series boost grid-connected system with the power balancer according to claim 2, wherein, each power balancer is controlled by the closed-loop control of the output voltage of the N photovoltaic DC converters.

11. The power balancing method for a large-scale photovoltaic DC series boost grid-connected system according to claim 5, wherein, each power balancer comprises a control signal input end, a main power circuit, and a current path connection end;

the control signal input end is configured to obtain an output voltage value $V_i$ of a corresponding photovoltaic DC converter and an average value $V_a$ of output voltage values of the N photovoltaic DC converters;

the main power circuit is configured to control a current between the input ends of the two adjacent photovoltaic DC converters based on a difference between the values of $V_i$ and $V_a$;

two ends of the current path connection end are respectively connected to the input ends of the two adjacent photovoltaic DC converters for establishing a current path.

12. The power balancing method for a large-scale photovoltaic DC series boost grid-connected system according to claim 11, wherein, a method of controlling the current between the input ends of the two adjacent photovoltaic DC converters based on the difference between the values of $V_i$ and $V_a$ is as follows:

wherein when $V_i>V_a$, the power balancer corresponding to the $i^{th}$ photovoltaic DC converter is configured to generate the negative current based on the difference between the values of $V_i$ and $V_a$, and shunt the output current of the photovoltaic power generation unit corresponding to the $i^{th}$ photovoltaic DC converter to reduce the input current of the $i^{th}$ photovoltaic DC converter;

wherein when $V_i<V_a$, the power balancer corresponding to the $i^{th}$ photovoltaic DC converter is configured to generate a positive current based on the difference between the values of $V_i$ and $V_a$, and merge with the output current of the photovoltaic power generation unit corresponding to the $i^{th}$ photovoltaic DC converter to increase the input current of the $i^{th}$ photovoltaic DC converter.

13. The power balancing method for a large-scale photovoltaic DC series boost grid-connected system according to claim 5, wherein, each power balancer is provided with a bypass circuit, and an output end of each photovoltaic DC converter is provided with a shorting circuit; wherein when any one of the N photovoltaic DC converters fails, a corresponding photovoltaic power generation unit is configured to be connected via the bypass circuit to a photovoltaic DC converter adjacent to the failed photovoltaic DC converter through the power balancer corresponding to the failed photovoltaic DC converter, and an output end of the failed photovoltaic DC converter is shorted through the shorting circuit, so as to maintain an access of the output end of the photovoltaic DC converters to the DC grid after being connected in series.

14. The power balancing method for a large-scale photovoltaic DC series boost grid-connected system according to claim 5, wherein, each photovoltaic DC converter adopts a double closed-loop control strategy of an input voltage and an input current for a maximum power point tracking control.

15. The power balancing method for a large-scale photovoltaic DC series boost grid-connected system according to claim 5, wherein, each power balancer is controlled by a closed-loop control of the output voltage of the N photovoltaic DC converters.

* * * * *